United States Patent
Coleman et al.

(10) Patent No.: US 6,651,421 B2
(45) Date of Patent: Nov. 25, 2003

(54) COLEMAN REGENERATIVE ENGINE WITH EXHAUST GAS WATER EXTRACTION

(76) Inventors: Richard R. Coleman, deceased, late of Mukilteo, WA (US); Thelma Coleman, executrix, 3026 Robert Dr. #3 Woodridge, IL (US) 60517

( * ) Notice: Subject to any disclaimer, the term of this patent is extended or adjusted under 35 U.S.C. 154(b) by 0 days.

(21) Appl. No.: 09/970,032

(22) Filed: Oct. 2, 2001

(65) Prior Publication Data

US 2002/0078689 A1 Jun. 27, 2002

Related U.S. Application Data

(60) Provisional application No. 60/237,558, filed on Oct. 2, 2000.

(51) Int. Cl.[7] .............................................. F02C 7/143
(52) U.S. Cl. ..................................... 60/39.17; 60/39.52
(58) Field of Search ................................ 60/728, 39.17, 60/39.52

(56) References Cited

U.S. PATENT DOCUMENTS 3,785,145 A * 1/1974 Amann ...................... 60/39.24
6,260,348 B1 * 7/2001 Sugishita et al. .......... 60/39.12
6,263,661 B1 * 7/2001 van der Burgt et al. ... 60/39.17

* cited by examiner

Primary Examiner—Ehud Gartenberg
(74) Attorney, Agent, or Firm—Patrick M. Dwyer (57) ABSTRACT

An improved turbine engine topology, wherein the improvement comprises a repositioning, with respect to a conventional intercooled regenerative turbine engine topology, of exhaust gas output from a low pressure turbine stage to a regenerator, to an exhaust gas output from a high pressure turbine stage to the regenerator. The engine topology may additionally employ, as an intermediate stage between the high pressure turbine and the low pressure turbine, a feedback control system, whereby the exhaust gas output from the high pressure turbine stage to the regenerator flows through the feedback control. The engine topology may advantageously also employ an additional cooler and an additional exhaust gas output in the feedback control, whereby exhaust gas flows from the feedback control through the additional cooler to a high pressure compressor stage, or the exhaust gas can flow from the feedback control through a bottoming cycle to the high pressure compressor stage. An exhaust gas condenser may advantageously be placed into the bottoming cycle system. The bottoming cycle/condenser improvements may alternatively be effected an other wise conventional intercooled regenerative turbine engine topology.

5 Claims, 9 Drawing Sheets

COLEMAN REGENERATIVE ENGINE WITH EXHAUST GAS WATER EXTRACTION

This application claims priority to U.S. Provisional Patent Ser. No. 60/237,558 filed Oct. 2, 2000.

TECHNICAL FIELD

The invention relates to the field of gas turbine engines and to the field of power generation and to water reclamation; more particularly, it relates to method and apparatus for a gas turbine regenerative engine with exhaust gas water extraction.

BACKGROUND OF THE INVENTION

Variations of Gas Turbines

There are many variations on simple cycle gas turbines. Each offers something special, be it operating economies or features that meet specific needs. The features might be small size, lightness in weight, high reliability, simplicity, or another measurable attribute. Emphasis is often placed on performance and power density, and achieving these objectives through use of known technologies and sound design principles for compressors, turbines, combustors, heat exchangers, and technology from related conventional materials sciences would be desirable. It is expected that achieving large gains requires the component arrangement to be new and different, to depart significantly from conventional designs. Any departure that results in an increase in complexity also has to significantly improve performance to be commercially useful; the more the departure, the more attractive the gains have to be.

Without question, component research and development efforts over recent years have served well to define advanced levels of aerodynamic and thermodynamic component efficiency. By combining these advances with similar gains in materials sciences and cooling technologies, capability now exists to design for high stage pressure ratios and high operating temperatures. But adopting an approach that would capture the full range of these advances would be very costly and would involve undesirably high risks. What is needed are the benefits to be derived from a new flow-path arrangement, rather than high stage loadings, high temperatures, and high stresses.

Fundamental Combustion Characteristics of Fuels

For most gaseous fuels, the products of complete combustion are carbon dioxide and water (in the form of water vapor). Depending on content, small amounts of sulphur dioxide can be produced, along with other gaseous products. However, the most significant products of combustion, by far, will be carbon dioxide and water. The rest, for the purpose of this discussion, can be ignored. The most important fundamental result is that for every pound of fuel burned, in combination with the ambient air used to support combustion, the gases produced will contain as much as 2.25 pounds of water vapor and up to 2.75 pounds of carbon dioxide. Until now, it does not appear that any attention has been given to recovering any of the products of this combustion, let alone recovery of the exhaust water. Fruitful human endeavors have always depended upon a readily available water supply. What is desirable, and what would be different from any other power producing system, is a power producing system from which exhaust gas water may readily be recovered. What is needed is a source of water that generates power efficiently, particularly in drought-ridden areas or desert regions; what is needed is an engine design for applications in developing regions that need two vital commodities: water and power. What is needed is a design that is independent of geographical location, climate, or changing meteorological conditions, but which does not have a negative impact on other engine favorable operating characteristics.

DISCLOSURE OF THE INVENTION

What is disclosed is an engine design for applications in developing regions that need two vital commodities: water and power.

The benefits disclosed herein are derived as follows:

A. First, only flow path arrangements that will enhance thermodynamic capability without depending on new, high-temperature technologies are considered. If high stage pressure ratios are not absolutely needed to achieve high cycle efficiency, then another way to get more power and better efficiency for the same size is to be employed.

B. Any special advantages to using heat exchangers such as regenerators or intercoolers in a new flow path are considered with a view toward achieving gains in efficiency (especially fuel saving) that outweigh any added complexity of incorporating the coolers into any new flow path.

C. Use of a bottoming cycle to augment output power is considered as well, especially as to whether it yields enough improvement, and how best to incorporate a bottoming cycle into the new system.

The resulting system disclosed is designed to fill a dual need; that is, provide a source of water while generating power efficiently. The flow path arrangement has been tailored to accomplish both. In that sense, the configuration is quite different from conventional through-flow designs; however, the components are well within known capabilities. The same is true for the heat exchangers (regenerators and coolers) and for elements of the bottoming cycle disclosed herein as well.

In simple terms, a bottoming cycle to increase thermodynamic efficiency, and a condensing unit to recover water from the products of combustion are preferably added to a basic but novel controlled feedback regenerative turbine engine, also referred to herein as the regenerative engine. The resulting configuration is unique in that it can deliver power efficiently while producing significant amounts of potable water, features that can be a priceless combination in drought-ridden areas or desert regions.

The core of the disclosed power/water system is the novel regenerative engine. This engine is based on well-established technologies related to successful turbine engines. But the novel regenerative engine differs from others in production in that the flow path is tailored to maximize efficiency and output power well beyond conventional practice. For example, fuel consumption rate of a disclosed regenerative engine is at least 10 percent lower than that of a conventional diesel engine, while specific power is roughly twice that of the most advanced turbine engine. The novel flow path for such an engine may be seen in FIG. 2.

An improved turbine engine topology is disclosed, wherein the improvement comprises a repositioning, with respect to a conventional intercooled regenerative turbine engine topology, of exhaust gas output from a low pressure turbine stage to a regenerator, to an exhaust gas output from a high pressure turbine stage to the regenerator. The engine topology may additionally employ, as an intermediate stage between the high pressure turbine and the low pressure turbine, a feedback control system, whereby the exhaust gas output from the high pressure turbine stage to the regenerator flows through the feedback control. The engine topology may advantageously also employ an additional cooler and an additional exhaust gas output in the feedback control, whereby exhaust gas flows from the feedback control through the additional cooler to a high pressure compressor stage, or the exhaust gas can flow from the feedback control through a bottoming cycle to the high pressure compressor stage. An exhaust gas condenser may advantageously be placed into the bottoming cycle system. The bottoming cycle/condenser improvements may alternatively be effected an other wise conventional intercooled regenerative turbine engine topology.

BEST MODE OF CARRYING OUT THE INVENTION

The system may be optimally sized for roughly 10,000 KW for each unit, but a unit can be sized to accommodate particular user recommendations and needs. The concept does not generally change with size. Size might well be chosen to promote design for mass production of units that can be interchanged easily to facilitate maintenance or permit transportability from one region to another within a power grid. Equally important, the size choices can also facilitate application to wide areas of market interest.
Components Conventional components are, for the most part, all that is needed. Preferred compressors are well within the state-of-the-art, with some engineering required only for matching and for variations in flow; anticipated stage pressure ratios are well within current practice parameters. Turbines are also well within state-of-the-art, with operating temperatures well below levels that might otherwise require special cooling, with engineering only required to accommodate variations in flow. Stage loading is also well within current practice, and no new exotic materials are needed, and no introduction of high temperature is required.

Preferred combustors require some engineering to accommodate flow variations in the system. A preferred regenerator is located in a high density flow path, resulting in small size while transferring heat effectively, and significantly lowering volume compared to traditional designs. Preferred intercoolers encounter no known barriers.

A preferred bottoming cycle uses F-85 organic fluid in a closed loop; no problems with use in conventional heat exchangers or turbines are expected. A preferred condensing system combines with a bottoming cycle to remove water from gases at high pressure. Condensing system size is minimized by high density environment.

Figure 1:
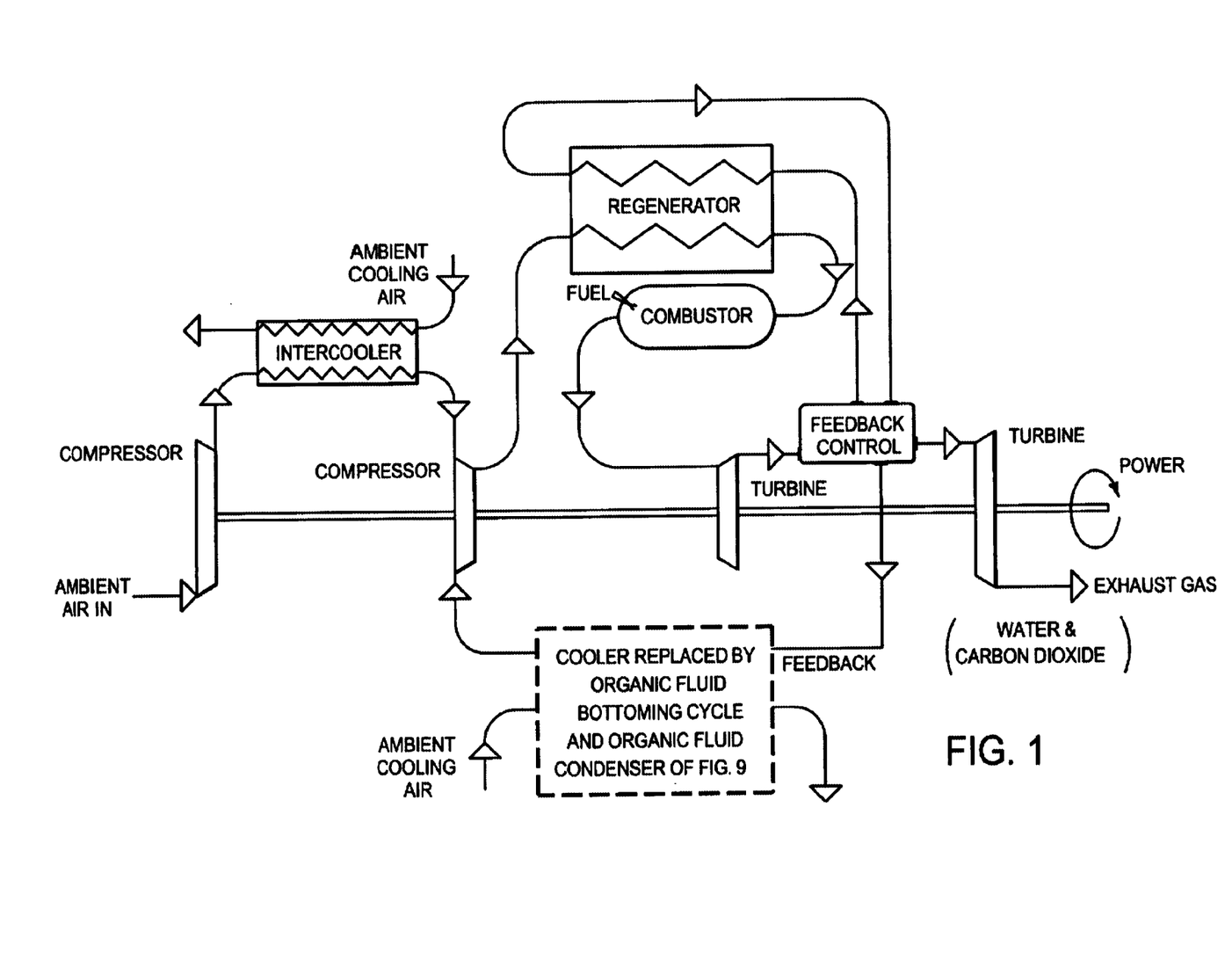
FIG. 1 is a schematic of the novel regenerative feedback engine with bottoming cycle and exhaust gas condensation.
Figure 2:
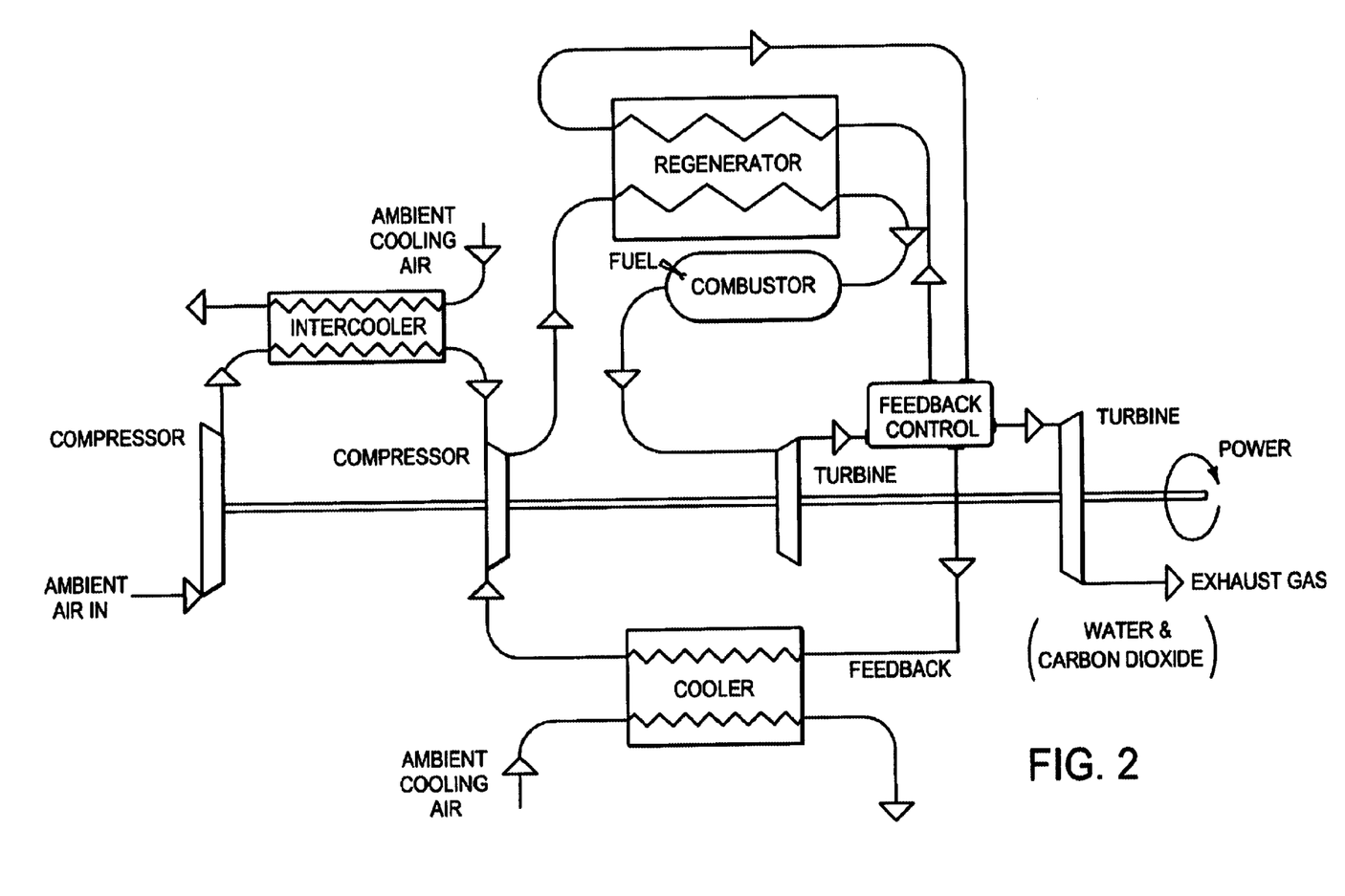
FIG. 2 is a schematic of an alternate embodiment of the novel regenerative feedback engine.
Figure 3:
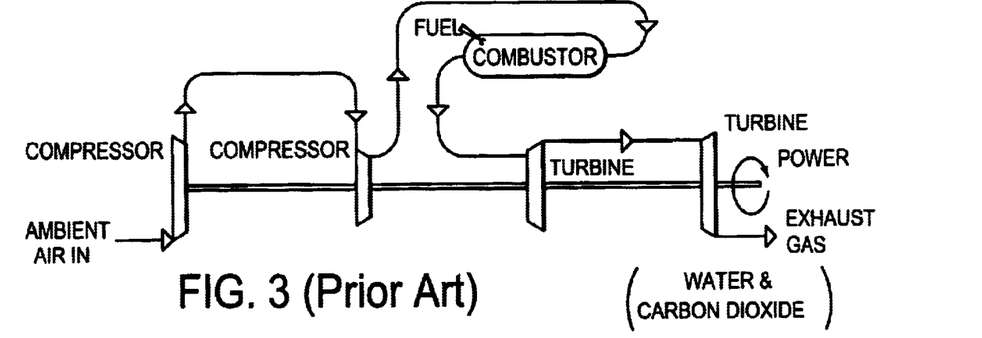
FIG. 3 is a schematic of a conventional simple cycle engine.

Turning now to the drawings, the invention will be described in a preferred embodiment It may be seen from FIG. 2 that the flow path is quite different when compared to familiar and simpler conventional turbojet and turboshaft engines shown in FIG. 3, and is characterized by a more complex arrangement of components. In FIG. 3, the flow paths through the simplest of turbine engine arrangements may be seen. This system is a through-flow, simple cycle gas turbine engine. Compressors provide the high pressure ratio required, and fuel is burned to raise the energy level so that the turbines can provide enough power to drive the compressors and the output shaft. In this illustration, shaft power is extracted, rather than jet thrust. For the sake of maximizing fuel efficiency, this conventional system demands a cycle that operates at high pressure ratios and high temperatures, both of which require continual advances in technology, resulting in costly research.

For example, the push toward high temperature operation requires expensive cooling techniques to avoid exceeding material limits. Temperatures in a high output version of the system illustrated in FIG. 3 can be above 2500 F, which is at or near the melting points of special alloys. The extreme measures adopted to deal with high temperatures have introduced hidden complexities and concerns for high initial costs and potentially expensive maintenance procedures. At the same time, the push toward better fuel economy has required that higher pressure ratio be provided by fewer stages, resulting in highly sensitive aerodynamic and thermodynamic designs that are subjected to high stresses and more critical matching requirements. Regardless of component advances, inherent inefficiencies at most partial-power conditions continue to be shortcomings of the engine arrangement illustrated in FIG. 3. Although the flow path has earned the name Simple Cycle, the constant push to do better has forced research into new technology areas that will continue to drive costs upward in ways that are anything by 'simple'.

Figure 4:
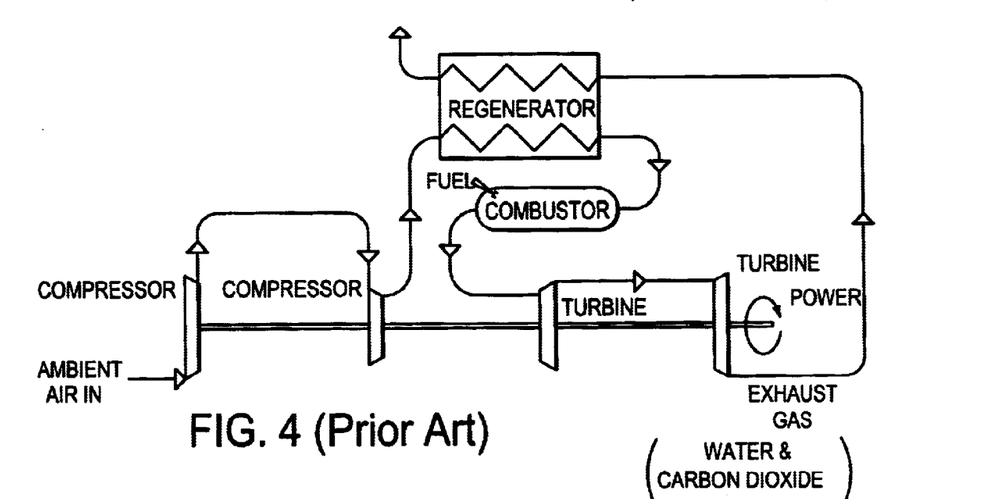
FIG. 4 is a schematic of a conventional regenerative engine.

In part, to address the concern for better fuel consumption, the regenerative (or recuperative) engine cycle (FIG. 4) was introduced. Exhaust energy is recovered by using at least a portion of the exhaust gas to heat air discharged from the compressors before adding fuel in the combustor. This approach adds a heat exchanger before fully exhausting the hot gases. Without question, this improved arrangement saves fuel; however, it requires extreme care in design to minimize pressure losses and to avoid increasing back pressure, both of which have a significant negative impact on performance. In addition, these performance considerations lead designers toward very large heat exchangers to minimize flow restrictions and maximize heat transfer.

Figure 5:
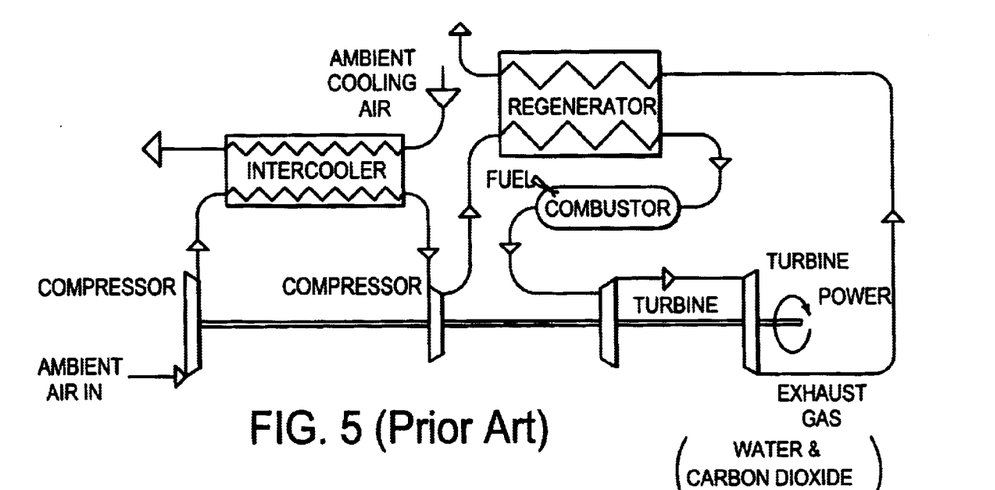
FIG. 5 is a schematic of a conventional intercooled regenerative engine.

Another approach to minimizing fuel consumption is to increase the overall pressure ratio without increasing the amount of work required to drive the compressors. The system illustrated in FIG. 5 cools the air before compressing it as a means of further increasing its density. Cooling the incoming ambient air is thought to introduce intolerable losses, but placing a heat exchanger between compressor stages is the most convenient and the most profitable. This arrangement, with cooling between compressor stages, has become known as intercooling. When this flow path is combined with that of the regenerative engine, the result is the intercooled regenerative configuration of FIG. 5, and incorporates the fuel saving features of each. These conclusions are widely accepted and have been used in applications where fuel economy is the more significantly driving factor than size and/or weight of the equipment. In most aircraft applications, for example, these approaches probably never would be considered. However, for stationary power plants or some large vehicles (such as ships or locomotives), the arrangement becomes a highly acceptable choice. The fuel saving is more than worth the cost of added equipment or increase in complexity. In any case, it is clear that the simple cycle engine, by itself, is most preferred for its basic simplicity. It is recognized that some of that simplicity must be sacrificed to achieve significant gains in performance.

The regenerator has two inherent disadvantages. One is that its location at the engine exhaust places it in an area where discharge to ambient pressure (and at much lower relative air density) requires a very large heat exchanger for best high heat transfer effectiveness. The second disadvantage is that a higher gas temperature is needed to enhance transfer of relatively more heat to the air before it enters the combustor. What is needed is a relocation of the regenerator to an area more conducive to transferring heat and to reducing size. What is now disclosed is that by recirculating hot gases from between the turbine stages, two significant gains can be made. First, size of the regenerator can be reduced enormously (better than 5:1) and the heat transfer is improved because of the more favorable conditions. In improving the conventional intercooled recuperated engine cycle (See FIG. 5), the intercooler is advantageously left unchanged, as the potential for large improvements in performance can readily be met with just the relocation of the regenerator.

Optimalization of amount of recirculation, the most reasonable thermodynamic balance of temperatures and pressure ratios, and system fuel and gas flow control requirements is effected by a feed-back control that is synchronized with fuel and power settings. In addition, component performance capabilities in a variable flow environment are also desirable optimized to enhance aerothermodynamic matching. Thus required performance standards can be met without the need to rely on advanced technology components, and so a turbine operating temperature is chosen that does not require either internal blade cooling or stage pressure ratios that might demand extensive development testing.

Figure 6:
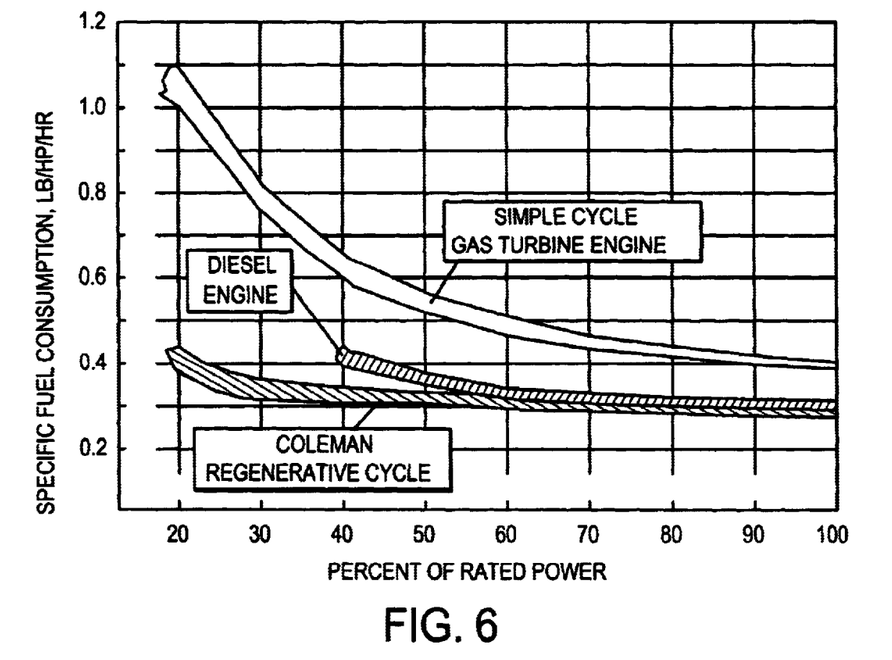
FIG. 6 is a graph of fuel consumption comparisons.

These advantages of the disclosed regenerative feedback engine (FIG. 2), combined with a requirement for good fuel economy throughout the entire operating range, outweighs any concerns about increase in complexity. Fuel consumption comparisons of the regenerative engine with high technology gas turbines and modern Diesel engines is shown in FIG. 6. The novel regenerative engine of FIG. 2. has superior potential in the part-power region, where the vast majority of engines operate most of the time. In particular, performance and operating time below 60 percent power are of major interest in nearly all vehicle and stationary systems. The relative flatness of the fuel consumption rate throughout is unique and unmatched by other more familiar engine types.

It was most encouraging to learn that the concept did not require turbine temperatures above 2200 F, at a point in time when other turbine engines were being designed for operation at much higher levels. Compressor stage pressure ratios also do not need to be above 6:1, which is well under the values required for other gas turbines. Because of the recirculation, flow-path arrangement, and component locations, the output power for a given amount of inlet airflow was found to be far above that of other engines designs. High technology gas turbines might reach 250 HP for each pound of air used, while the novel regenerative engine disclosed exceeds 600 HP per pound of air. This is widely regarded as a most important measure of power versus physical size.

Figure 7:
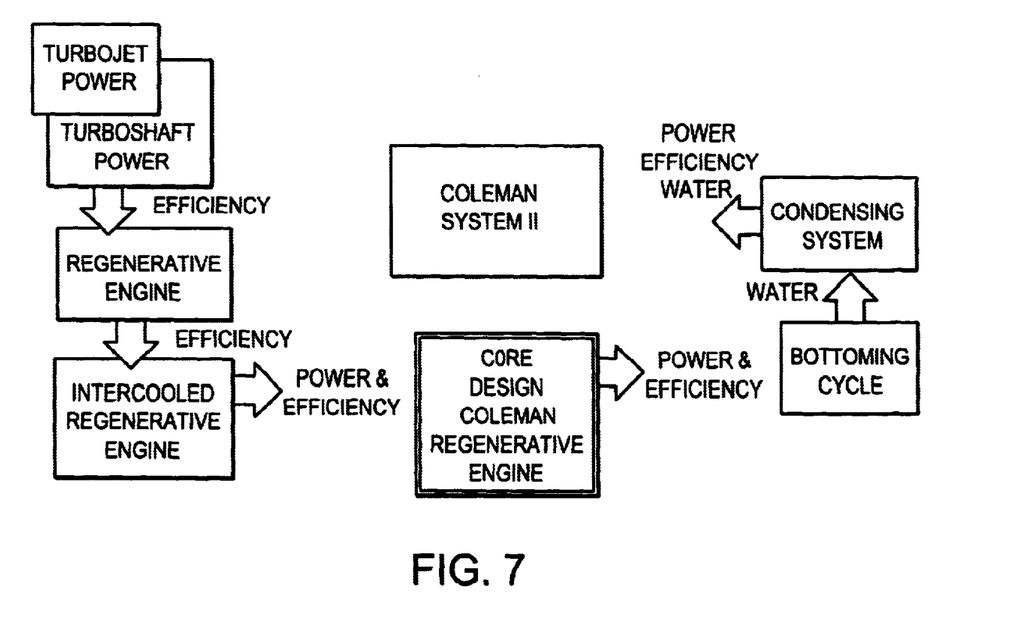
FIG. 7 is a flow chart depicting the evolution of the system of the invention.

A summary of the development of the novel regenerative engine, though several conventional stages, to the novel rearrangement of the flow of the regenerative exhaust gases, and then onward to additional features added to achieve the disclosed optimized water extraction power producing engine, is shown in FIG. 7. The path followed to arrive at the novel design starts with the turboshaft/turbojet, and progresses through regenerative, and intercooled versions.

The novel regenerative engine (FIG. 2) differs from conventional designs in that the component arrangement and flow path permit a dramatic increase in specific power and power density, making it more than competitive in size (at least 2:1 better) when compared to the most compact engines that have so far been developed. The combination permits control of feedback flow that can be tailored in the recirculation loop to meet power demands. This configuration introduces a new capability to augment power output while minimizing fuel consumption (flattens the specific fuel consumption curve) over a much broader range of power than any other turbine engine concept. In another size-related area, the high temperature and high density gases in the regenerator provide a unique opportunity to transfer beat effectively while reducing volume by about 7:1 (compared to conventional designs where such devices are located at the engine exhaust). Taken together, these features result in an engine with performance and size characteristics unmatched in the industry, but at some increase in complexity. It will be appreciated however that there will be many applications where the economic advantages will far outweigh the complexity.

The invention is directed primarily at making big gains in fuel economy, while holding to the importance of increasing specific power. In review, it will be noted that the conventional regenerative engine, by itself (FIG. 4), could reduce fuel consumption, but not without some penalty in output power and engine size. Adding the intercooler (FIG. 5) served to further improve fuel economy and can increase output power at the same time, but it also increases engine weight and size. Regardless of these conventional choices, the fundamental simplicity of the simple cycle has to be sacrificed to effect a major change in performance, weight, or size.

Figure 8:
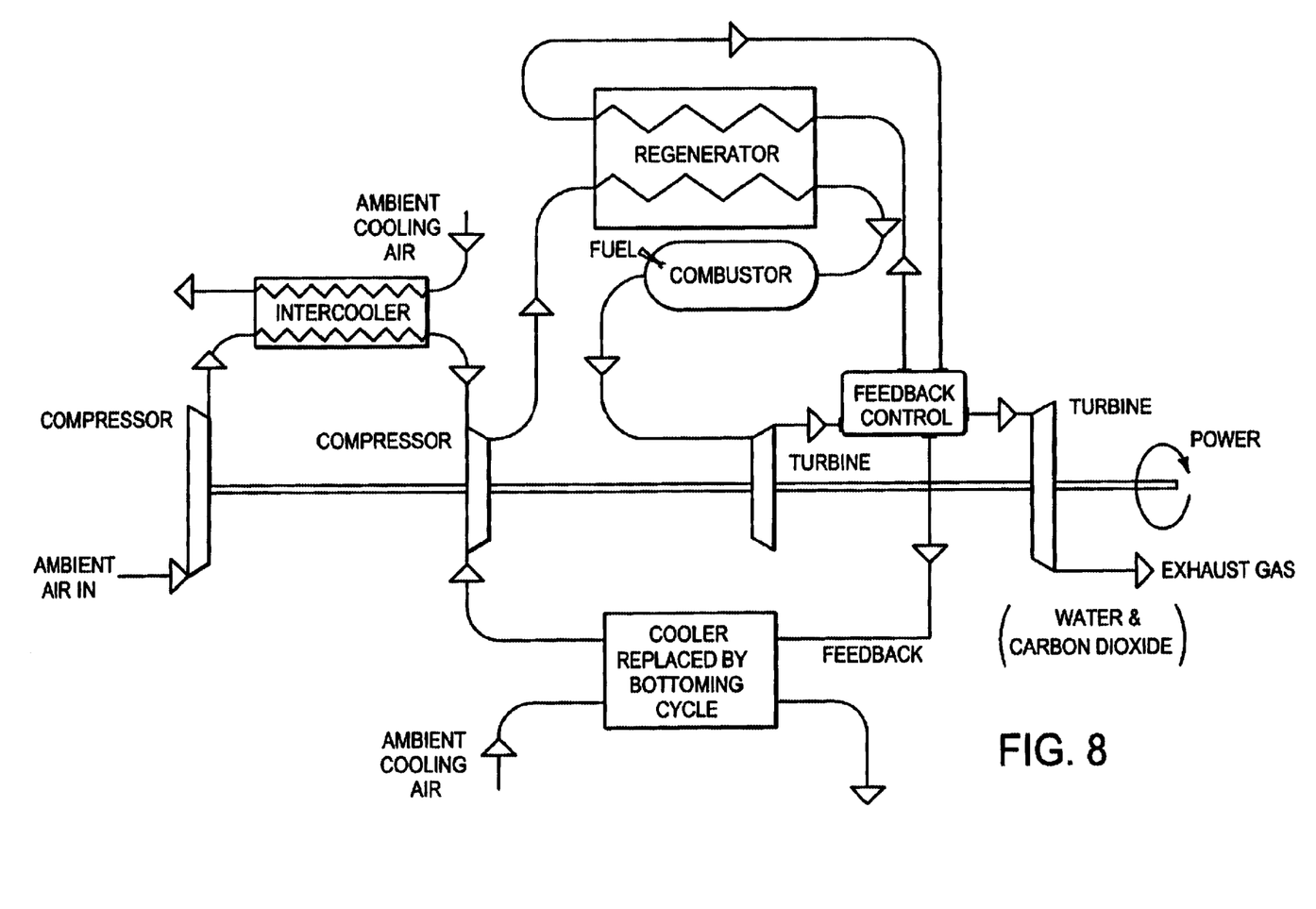
FIG. 8 is a schematic of the engine of FIG. 2 with the cooler replaced schematically by a bottoming cycle.
Figure 9:
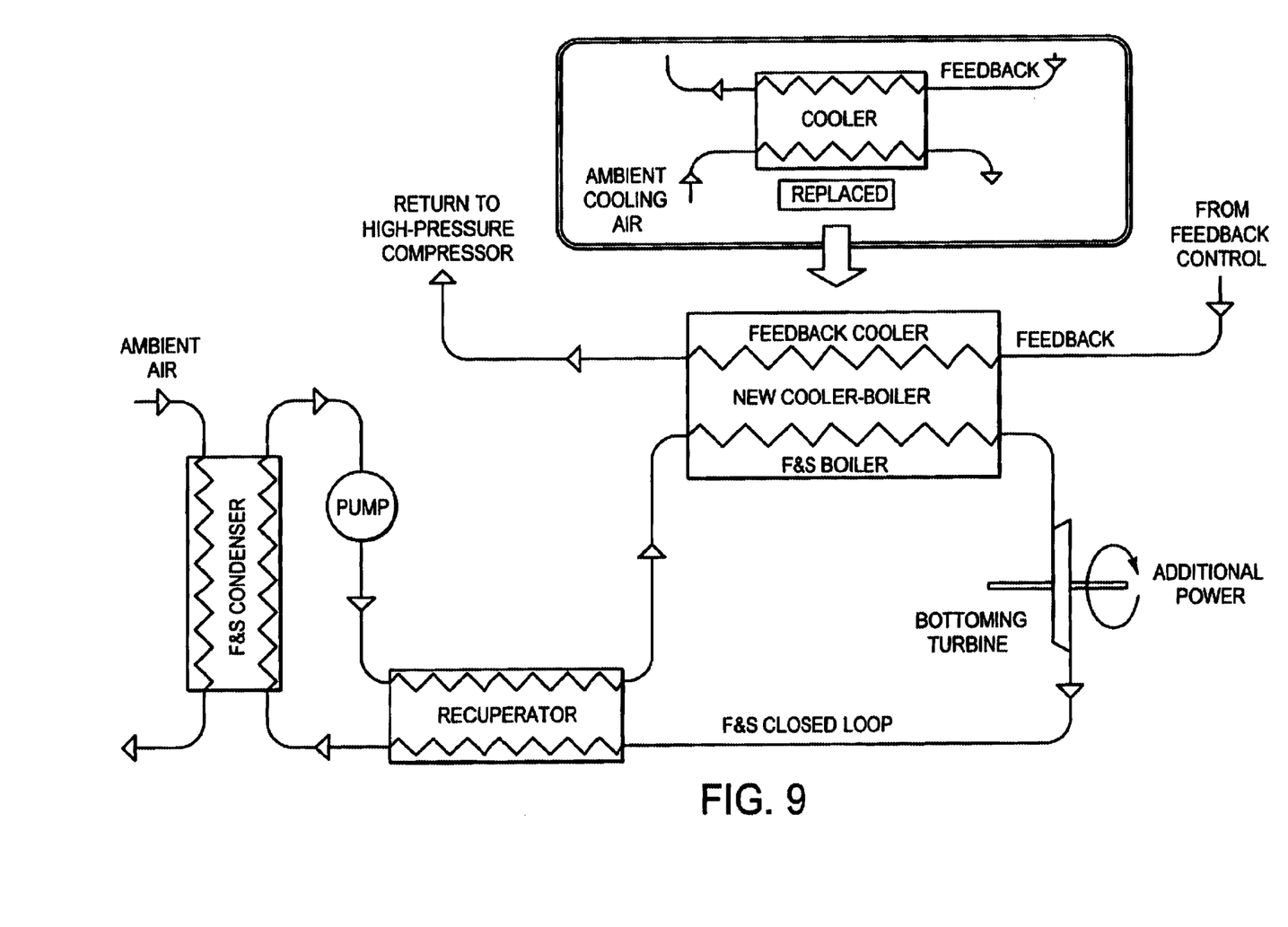
FIG. 9 is a schematic of a bottoming cycle.
Figure 10:
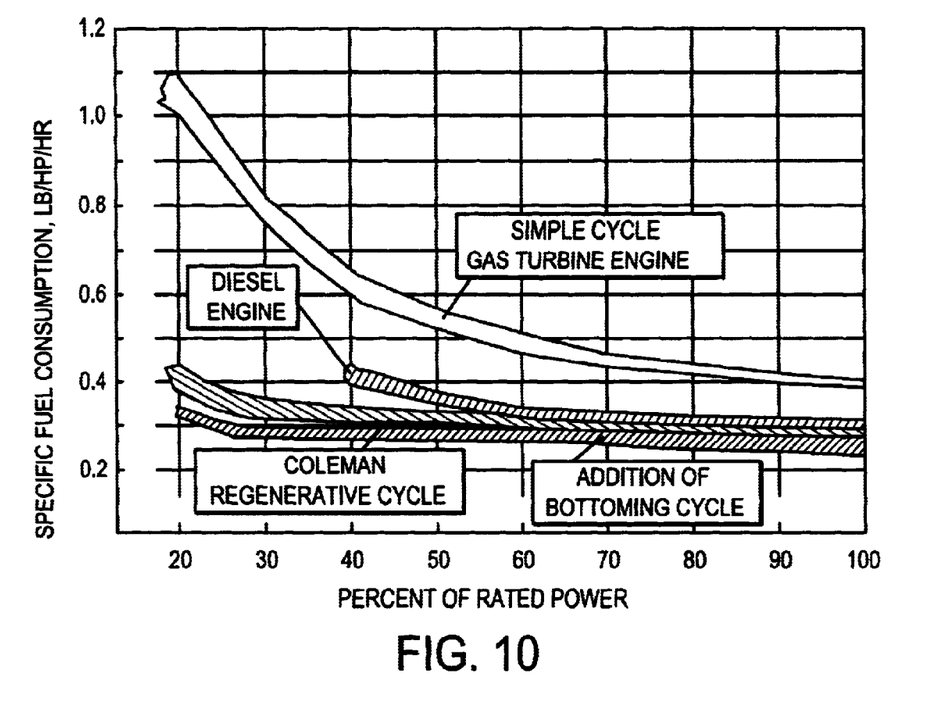
FIG. 10 is a graph of fuel consumption comparisons showing the addition of the bottoming cycle.

But can the novel regenerative feedback engine (FIG. 2) also be further improved in this regard? Could even greater and more compelling improvements be introduced to offset any added complexity? That question led to addressing a bottoming cycle as a means to further augment output power and fuel economy. A closed loop (FIGS. 8 & 9) is added to replace the feedback cooler of the FIG. 2 design. This addition has the benefit of augmenting power and reducing fuel consumption by another 10 to 12 percent, certainly worth considering in any power plant. A preferred fluid for the closed circuit of the bottoming cycle can be expanded to a gaseous state, used to drive a turbine, condensed, cooled, and again expanded within the thermodynamic boundaries of the feedback cooler. An preferred organic fluid, F85, fits these needs. By means of a straightforward combiner gear, the power output of the bottoming cycles augments the output of the basic novel regenerative engine. While a bottoming cycle is not a new idea, adapting it to the design shown in FIG. 2 represents more than just offsetting some previously-noted complexity. The novel regenerative engine, even with just the addition of a bottoming cycle, represents a much desired step ahead in size and performance attributes that are not available in any other engine. The resulting fuel consumption, shown in FIG. 10, indicates the level of expected performance improvement.

Figure 11:
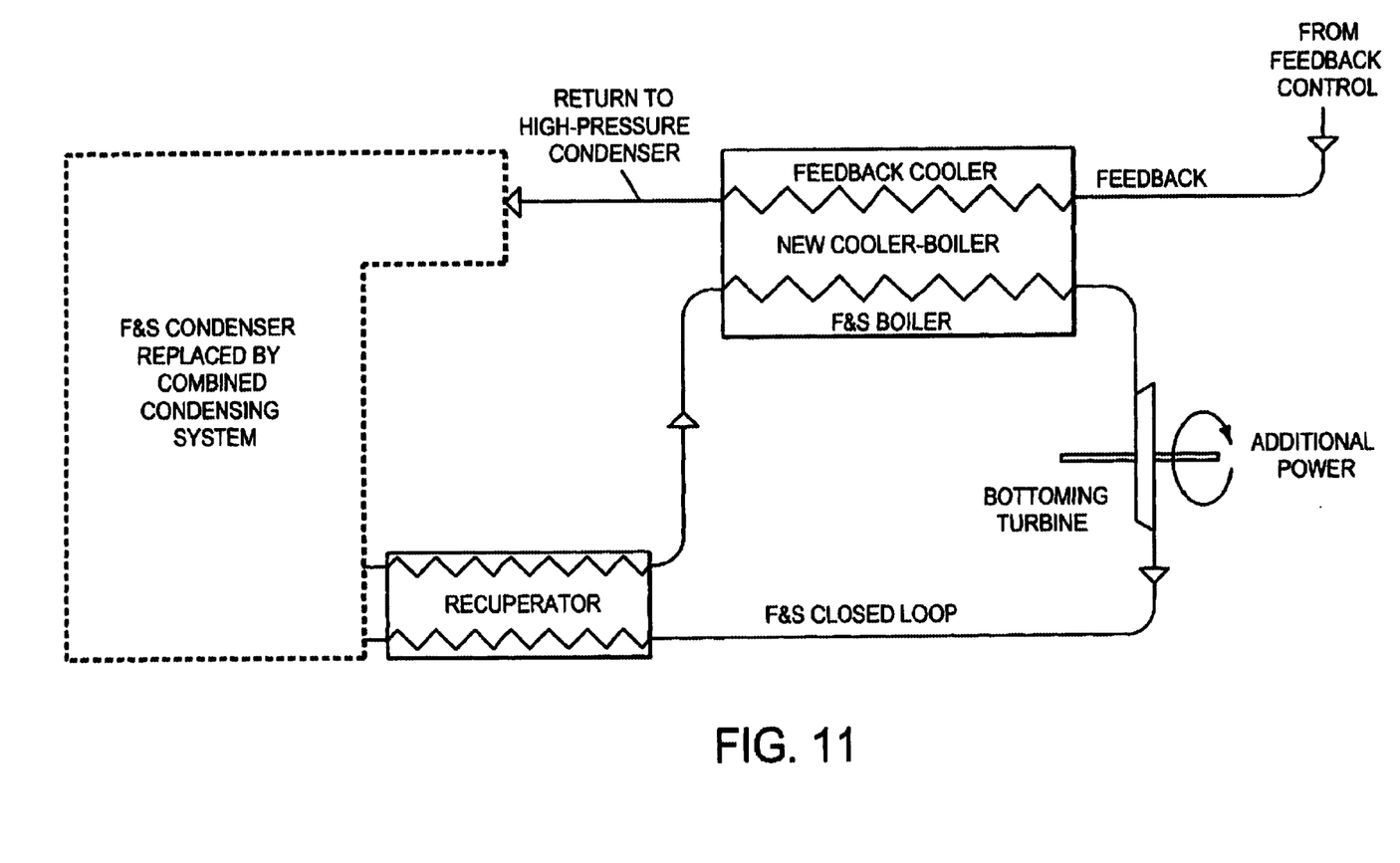
FIG. 11 is the schematic of FIG. 9 showing replacement of the F85 condenser.
Figure 12:
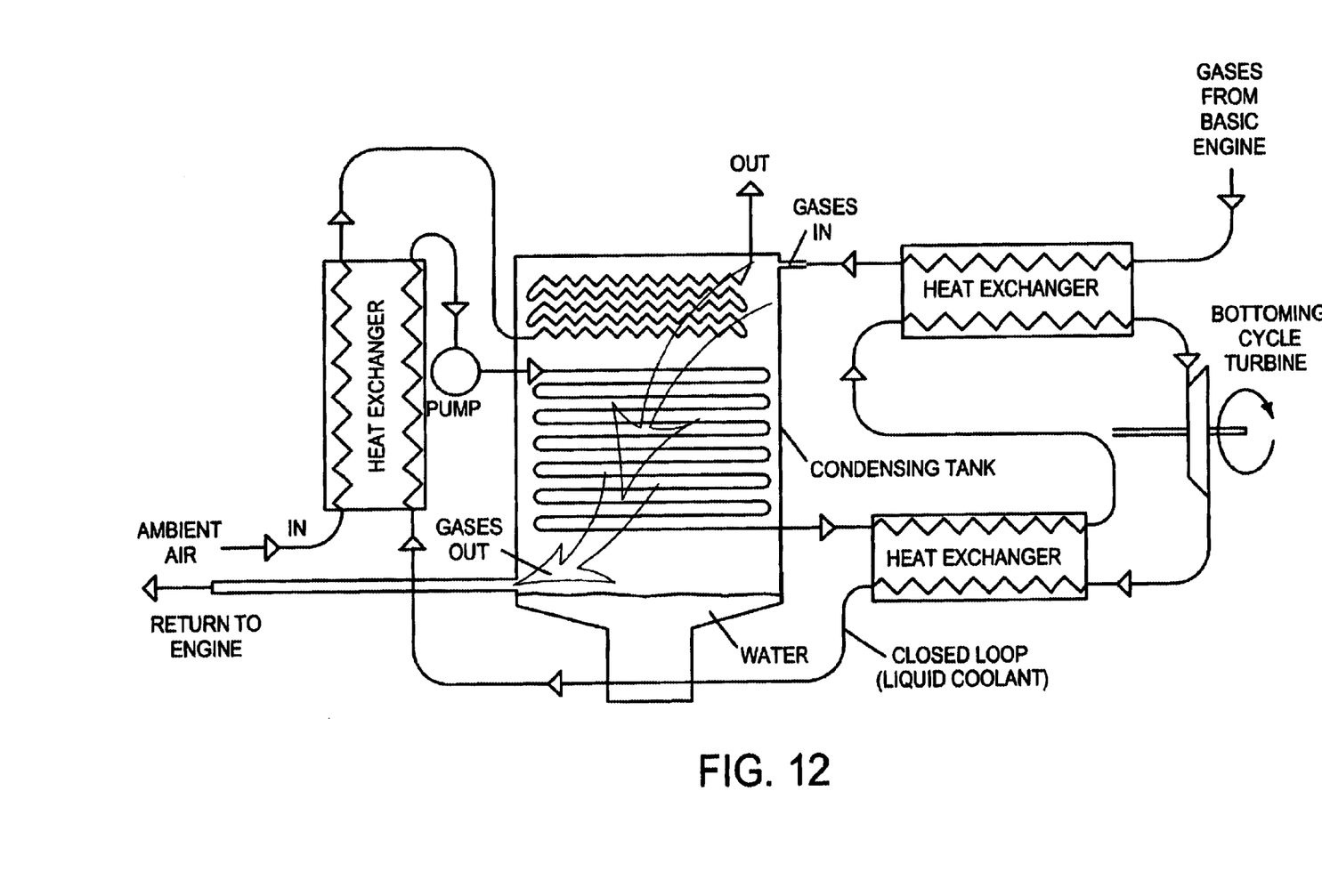
FIG. 12 is a schematic of the combined bottoming cycle and water condensing system of FIG. 1.

If the water in the products of combustion is also recovered however, the engine then fills the critical requirement of promoting development of many areas of the globe where water is at least as crucial or unavailable as the power to be produced from the engine. The payoff can be enormous, especially in areas that have readily available, abundant fuel reserves (gas or oil) but would, otherwise, remain uninhabited for lack of water and power. A preferred location in the flow path to precipitate the water with least operating loss is shown in FIGS. 11 & 12. A preferred location is in the bottoming cycle, using a second condenser. In FIG. 12 hot gases from the regenerative engine are passed through a cooling and condensing tank where water is precipitated and collected. The cooled gases are returned to the engine cycle (in particular, to the High-Pressure Compressor stage). Cooling is provided by a precooler that advantageously uses an ambient air heat exchanger and a liquid coolant heat exchanger, which is advantageously part of a bottoming cycle.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. An improved engine topology comprising, with respect to a conventional intercooled regenerative turbine engine topology, a bottoming cycle system whereby exhaust gas flows from turbine stage through the bottoming cycle to a high pressure compressor stage.

2. The engine topology of claim 1 further comprising, in the bottoming cycle system, an exhaust gas condenser.

3. An improved turbine engine topology, wherein the improvement comprises:
   (1) a repositioning, with respect to a conventional intercooled regenerative turbine engine topology, of exhaust gas output from a low pressure turbine stage to a regenerator, to an exhaust gas output from a high pressure turbine stage to the regenerator; and
   (2) as an intermediate stage between the high pressure turbine and the low pressure turbine, a feedback control system, whereby the exhaust gas output from the high pressure turbine stage to the regenerator flows through the feedback control; and
   (3) further comprising a bottoming cycle system and an additional exhaust gas output in the feedback control, whereby exhaust gas flows from the feedback control through the bottoming cycle to a high pressure compressor stage.

4. The engine topology of claim 3 further comprising, in the bottoming cycle system, an exhaust gas condenser.

5. The engine topology of claim 3 further comprising an additional cooler and an additional exhaust gas output in the feedback control, whereby exhaust gas flows from the feedback control through the additional cooler to a high pressure compressor stage.

* * * * *